(12) United States Patent
Oh et al.

(10) Patent No.: US 7,761,052 B2
(45) Date of Patent: Jul. 20, 2010

(54) CONTENT PROVIDING MOBILE TERMINAL AND METHOD

(75) Inventors: Dong-Hyuck Oh, Incheon (KR); Je-Hyun Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 1069 days.

(21) Appl. No.: 11/424,647

(22) Filed: Jun. 16, 2006

(65) Prior Publication Data

US 2006/0288091 A1 Dec. 21, 2006

(30) Foreign Application Priority Data

Jun. 17, 2005 (KR) .................. 10-2005-0052648

(51) Int. Cl.
- *H04B 7/185* (2006.01)
- *H04M 3/42* (2006.01)
- *H04M 1/00* (2006.01)
- *H04W 4/00* (2009.01)

(52) U.S. Cl. ............... 455/12.1; 455/414.1; 455/414.3; 455/426.1; 455/427; 455/430; 370/328; 379/32.04; 379/69; 379/70; 340/438; 700/90; 700/223; 341/23; 708/146; 701/33; 713/600

(58) Field of Classification Search ............... 455/12.1, 455/426.1, 430, 414.1, 414.3, 427, 556; 707/1; 379/32.04, 69, 70; 370/328; 340/438; 341/23; 708/146; 701/33; 713/600

See application file for complete search history.

(56) References Cited

U.S. PATENT DOCUMENTS

| | | | | |
|---|---|---|---|---|
| 3,917,915 A | * | 11/1975 | Karras | 379/32.04 |
| 3,924,111 A | * | 12/1975 | Farris | 700/90 |
| 4,005,388 A | * | 1/1977 | Morley et al. | 341/23 |
| 4,007,443 A | * | 2/1977 | Bromberg et al. | 708/146 |
| 4,172,969 A | * | 10/1979 | Levine et al. | 379/70 |
| 4,181,947 A | * | 1/1980 | Krauss et al. | 700/223 |
| 4,207,610 A | * | 6/1980 | Gordon | 701/35 |
| 4,207,611 A | * | 6/1980 | Gordon | 701/33 |
| 4,283,772 A | * | 8/1981 | Johnston | 713/600 |
| 4,304,968 A | * | 12/1981 | Klausner et al. | 379/69 |
| 4,345,315 A | * | 8/1982 | Cadotte et al. | 705/10 |
| 5,842,125 A | * | 11/1998 | Modzelesky et al. | 455/426.1 |
| 5,926,745 A | * | 7/1999 | Threadgill et al. | 455/12.1 |
| 6,141,010 A | | 10/2000 | Hoyle et al. | |
| 6,272,338 B1 | * | 8/2001 | Modzelesky et al. | 455/430 |
| 6,343,205 B1 | * | 1/2002 | Threadgill et al. | 455/12.1 |
| 6,529,731 B2 | * | 3/2003 | Modzelesky et al. | 455/427 |
| 6,690,268 B2 | * | 2/2004 | Schofield et al. | 340/438 |
| 6,807,571 B2 | * | 10/2004 | Hatano et al. | 709/219 |
| 7,099,479 B1 | * | 8/2006 | Ishibashi et al. | 380/281 |

(Continued)

FOREIGN PATENT DOCUMENTS

CN 1431817 7/2003

(Continued)

*Primary Examiner*—William D Cumming
(74) *Attorney, Agent, or Firm*—Lee, Hong, Degerman, Kang & Waimey

(57) ABSTRACT

A mobile communication terminal for providing a content and its method are disclosed. The mobile communication terminal for providing content includes a transceiver for receiving a content from a server; a display unit for displaying the content received from the transceiver on a pre-set region; and a controller for controlling the transceiver to receive the displayed content and controlling the display unit.

27 Claims, 7 Drawing Sheets

U.S. PATENT DOCUMENTS

| | | | |
|---|---|---|---|
| 7,383,037 B2 * | 6/2008 | Grossman et al. | 455/414.1 |
| 7,446,650 B2 * | 11/2008 | Scholfield et al. | 340/438 |
| 2004/0139215 A1 * | 7/2004 | Lanphear | 709/232 |
| 2006/0062172 A1 * | 3/2006 | Grossman et al. | 370/328 |
| 2006/0063516 A1 * | 3/2006 | Grossman et al. | 455/414.3 |
| 2006/0063567 A1 * | 3/2006 | Grossman et al. | 455/566 |
| 2006/0179129 A1 * | 8/2006 | Clayton et al. | 709/220 |
| 2006/0190980 A1 * | 8/2006 | Kikkoji et al. | 725/114 |
| 2006/0288091 A1 * | 12/2006 | Oh et al. | 709/219 |
| 2007/0061282 A1 * | 3/2007 | Ganguly et al. | 707/1 |
| 2007/0185884 A1 * | 8/2007 | Kantamneni | 707/10 |
| 2008/0109529 A1 * | 5/2008 | Story | 709/217 |

FOREIGN PATENT DOCUMENTS

| | | |
|---|---|---|
| CN | 1578518 | 2/2005 |
| EP | 1 443 736 A | 8/2004 |
| JP | 2001-211270 | 8/2001 |
| JP | 2002-215591 | 8/2002 |
| JP | 2003-263323 | 9/2003 |
| JP | 2004-364076 | 12/2004 |
| JP | 2005-037757 | 2/2005 |
| JP | 2005-159930 | 6/2005 |
| KR | 1999-0078840 | 11/1999 |
| KR | 10 2004 0055457 A | 6/2004 |

* cited by examiner

CONTENT PROVIDING MOBILE TERMINAL AND METHOD

CROSS-REFERENCE TO RELATED APPLICATIONS

Pursuant to 35 U.S.C. §119(a), this application claims the benefit of earlier filing date and right of priority to Korean Application No. 10-2005-0052648, filed on Jun. 17, 2005, the contents of which is hereby incorporated by reference herein in its entirety.

BACKGROUND OF THE INVENTION

1. Field of the Invention

The present invention relates to a content providing system and method thereof and, more particularly, to a content providing system for providing online contents to be effectively displayed at a mobile communication terminal, and a method thereof.

2. Description of the Related Art

In general, a mobile communication terminal is a device allowing a user to wirelessly page another party and be wirelessly connected for performing communications any time and anywhere through controlling of switching by a mobile switching center (MSC) while traveling in a service area managed by a base station (BS). The mobile communication terminal can support multimedia communications including images and videos, as well as data communications including symbols, numbers and characters.

The mobile communication terminal provides (1) online services such as online games, mobile internet services, a VOD (Video On Demand) function and a file download function, (2) various message functions such as chatting, instant messaging, text messaging, multimedia messaging and e-mail, (3) a call function such as a voice call and a video call, (4) camera functions such as video capturing and still image capturing, and (5) various supplementary functions such as a scheduler, phone book searching, a calculator, a memo pad, communication content recording, terminal state setting, calendar searching, world time checking, time alarm setting, video or music file reproducing.

Mobile communication terminals help to enhance quality of cultural life of users by providing online services allowing users to download music files, movie files and game files, especially among the diverse supplementary functions. As the online services are being provided as paid services, service providers are actively developing techniques for providing online contents in various forms.

However, the related art mobile communication terminal cannot suitably provide online services in the following aspects. That is, in order to receive desired online contents, the user must access a Web site that provides the online contents whenever the user wants such contents, check the matters contained in the online contents one-by-one, and execute the online contents. However, these cumbersome procedures are not effective in terms of time and cost.

BRIEF DESCRIPTION OF THE INVENTION

One aspect of the present invention involves the recognition by the present inventors of the drawbacks in the related art, as explained above. Based upon such recognition, improvements to a content provision function and system for mobile communication terminals can be achieved according to the present invention.

Certain features that may be part of the content providing system and method thereof will not be described in much detail, merely to prevent the characteristics of the present invention from being obscured. However, such additional features may also be part of the content providing system and method of the present invention, as would be understood by those skilled in the art.

An exemplary feature of the present invention is to provide a content providing system and a method which provide a content to a mobile communication terminal, so that the mobile communication terminal can display the content on a certain area (e.g., a pre-set region) of the display screen and download the content by using an automatic update function to enhance user convenience.

To implement at least the above feature in whole or in parts, the present invention provides a mobile communication terminal for providing content, comprising: a transceiver for receiving a content from a server; a display unit for displaying the content received from the transceiver on a pre-set region; and a controller for controlling the transceiver to receive the displayed content and controlling the display unit.

To implement at least the above feature in whole or in parts, the present invention also provides a method for providing a content of a mobile communication terminal, comprising: periodically receiving a content; and sequentially displaying the received content on a pre-set region of a display unit.

To implement at least the above feature in whole or in parts, the present invention also provides a method for providing a content of a mobile communication terminal, comprising: receiving first data of a content from a server when a pre-set condition is satisfied; selectively requesting second data corresponding to the first data from the server; receiving the second data of the content from the server; displaying one of the received first data and second data of the content on a pre-set region of a display unit.

To implement at least the above feature in whole or in parts, the present invention also provides content providing system, comprising: a mobile communication terminal for displaying a content on a pre-set region of a display unit and performing updating thereof, and a server for providing the displayed the content.

To implement at least the above feature in whole or in parts, the present invention also provides a mobile communication apparatus, comprising: a screen to display information; a transceiver to receive a multimedia announcement via a communications network; a memory to store the multimedia announcement received by the transceiver; and a processor, cooperating with the screen, the transceiver, and the memory to perform the steps of initially receiving text data of the multimedia announcement, subsequently receiving image data of the multimedia announcement that corresponds to the initially received text data after successfully receiving all text data, and displaying the received text and image data of the multimedia announcement at an appropriate position of the screen.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE INVENTION

A content providing system and a method which provide a content to a mobile communication terminal, so that the mobile communication terminal can display the content on a certain area (e.g., a pre-set region) of the display screen and download the content by using an update function to enhance user convenience will now be described with reference to the accompanying drawings.

A content providing system which provides a plurality contents to a mobile communication terminal whereby the mobile commutation terminal could display the plurality of online contents on a predetermined region of a display unit and download the online contents by using an automatic update function, and its method in accordance with some exemplary embodiments of the present invention will now be described with reference to the accompanying drawings.

Hereafter, the term "mobile communication terminal" is intended to refer to and cover various types of communication devices (i.e., mobile stations (MS), user equipment (UE), handsets, PDAs, etc.) that support mobility (or may be fixed) and allows communication of information via wired and/or wireless interfaces. The mobile communication terminal may have different configurations, such as a bar type, a folder type, a slider type, and the like.

Figure 1:
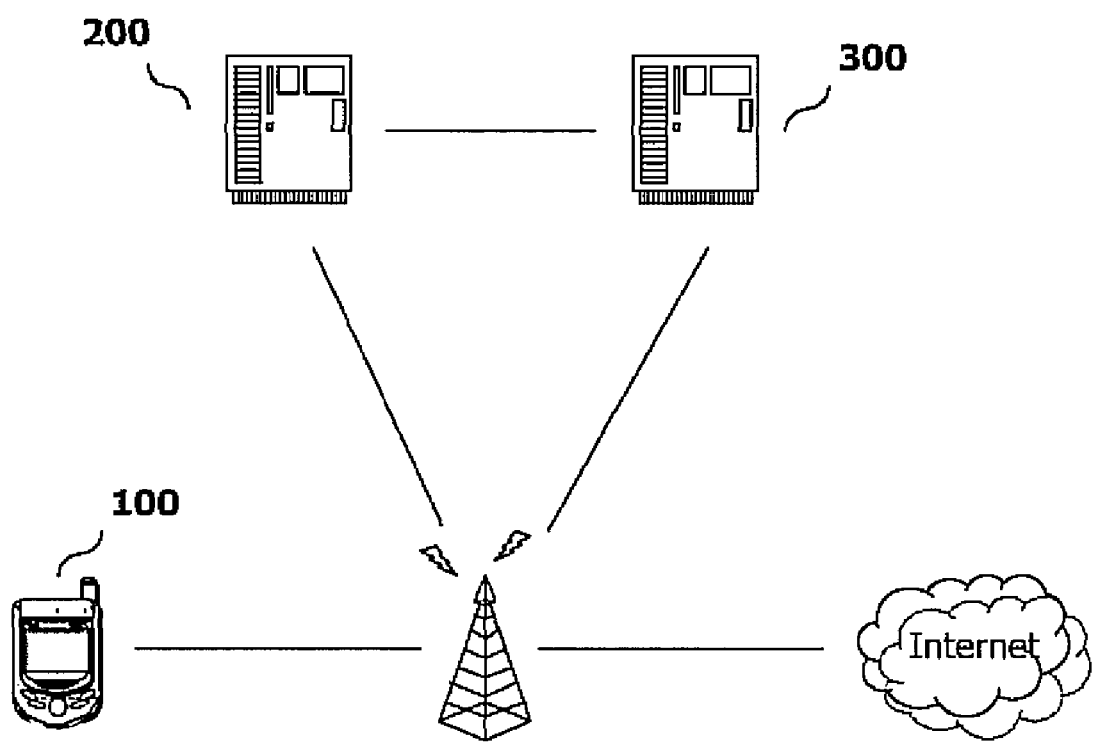
FIG. 1 shows a content providing system in accordance with the present invention.

FIG. 1 shows content providing system in accordance with the present invention.

As shown in FIG. 1, the content providing system may include: a first server 200 for registering at least one or more mobile communication terminals using an automatic update function; a mobile communication terminal 100 for sequentially displaying a plurality of online contents on a pre-set region of a display unit; and a second server 300 for periodically providing the displayed the online contents. Here, the online contents may comprise first data, or second data. The first data may represent text or the second data may represent images with respect to the online contents. These online contents may be intended for user to be provided with personalized contents, or intended for someone to provide commercials or advertisements. The online contents may be assigned an identification (ID) and a sequence number and sequentially displayed according to the assigned ID and sequence number. In this case, preferably, the ID and the sequence number are set by the second server 300.

An exemplary construction of the mobile communication terminal for providing online contents in accordance with the present invention will now be described with reference to FIG. 2.

Figure 2:
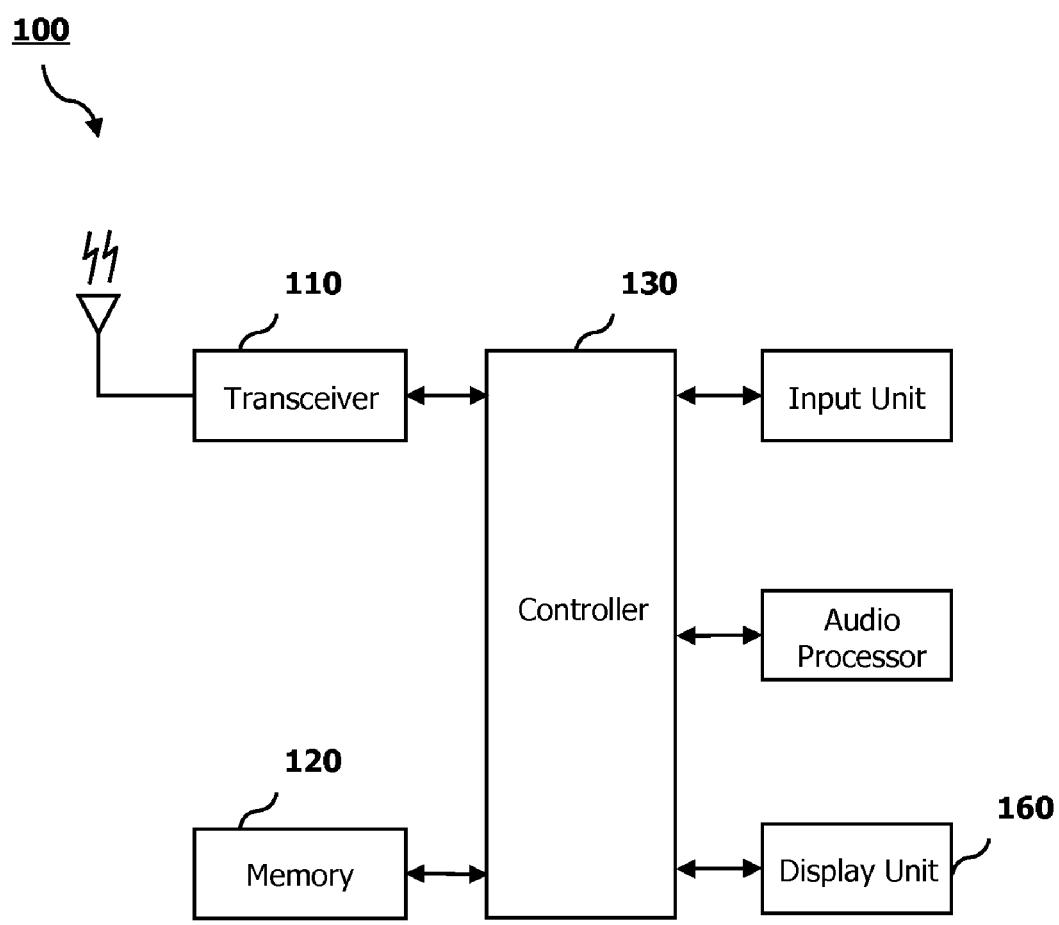
FIG. 2 is an exemplary schematic block diagram showing the construction of a mobile communication terminal providing online contents in accordance with the present invention.

FIG. 2 is a schematic block diagram showing the construction of an exemplary mobile communication terminal providing online contents in accordance with the present invention.

As shown in FIG. 2, a mobile communication terminal for providing online contents in accordance with the present invention may include: a transceiver 110 for periodically receiving a plurality of online contents; a memory (i.e., RAMs, ROMs, hard disk type memories, Flash memories, etc.) 120 for storing the received online contents; a display unit (e.g., LCD, PDP, etc.) 160 for sequentially displaying the stored online contents on a pre-set region; and a controller 130 for periodically updating the displayed online contents by using an automatic update function.

An exemplary method for providing online contents of the mobile communication terminal in accordance with the present invention will now be described with reference to FIG. 3.

Figure 3:
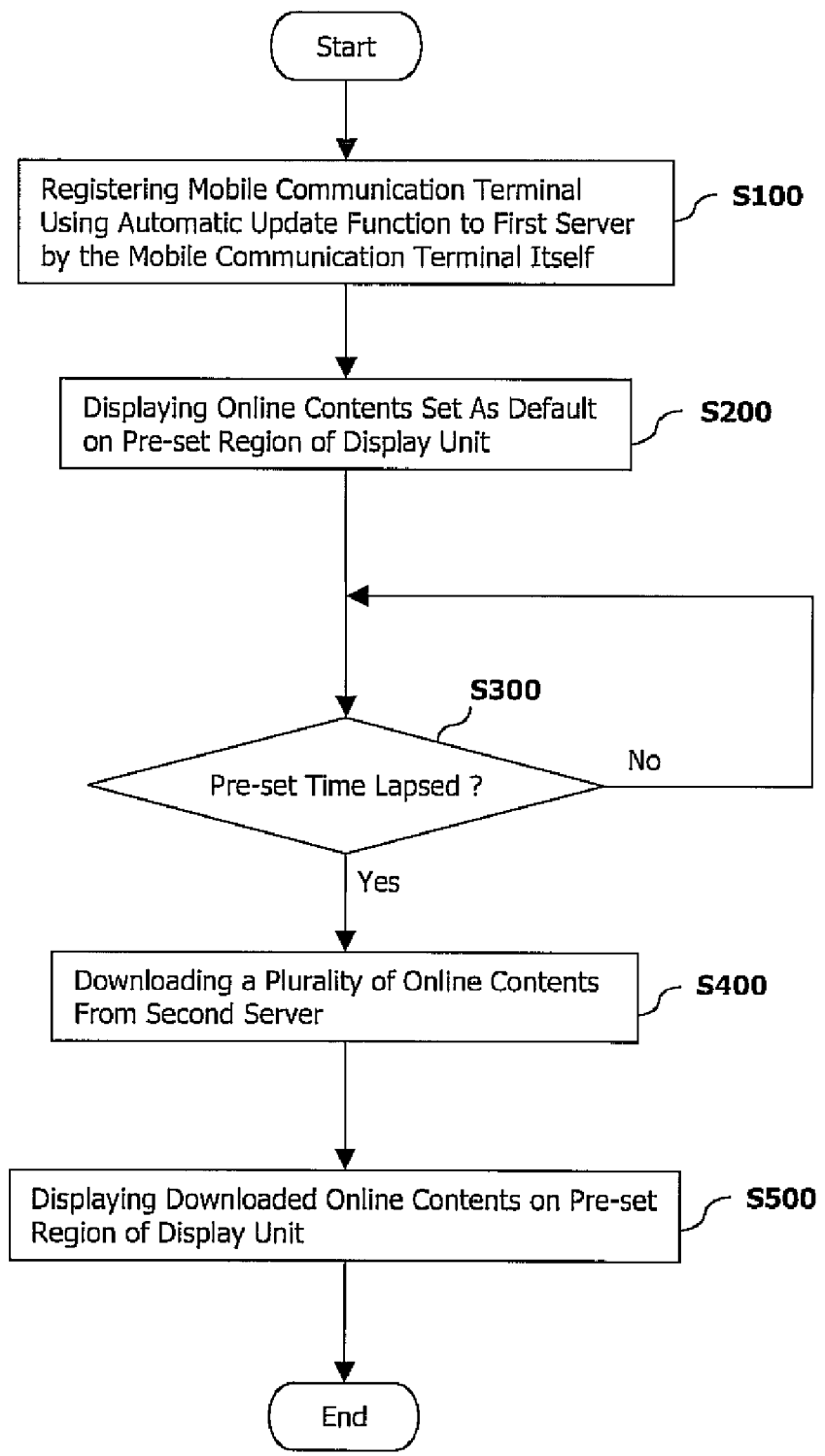
FIG. 3 is an exemplary flow chart illustrating the processes of a method for providing online contents of the mobile communication terminal.

FIG. 3 is a flow chart illustrating the processes of an exemplary method for providing online contents of the mobile communication terminal in accordance with the present invention.

As shown in FIG. 3, the method for providing online contents of a mobile communication terminal in accordance with the present invention may include: registering a mobile communication terminal using an automatic update function to a first server by the mobile communication terminal itself (step S100); sequentially displaying online contents set as default on a pre-set region of a display unit (step S200); checking whether a pre-set time has lapsed (step S300); downloading a plurality of online contents from a second server when the pre-set time lapses (step S400); and sequentially displaying the downloaded online contents on a pre-set region of the display unit (step S500).

The method for providing online contents of the mobile communication terminal will be described in more detail as follows.

First, when an automatic update function can be used, the controller 130 of the mobile communication terminal registers the mobile communication terminal to the first server 200 (step S100). Namely, the first server 200 can receive registration of at least one or more mobile communication terminals that use the automatic update function and manage them.

The mobile communication terminal 100 can set or release an active desktop function according to a user selection with respect to an option (i.e., a total number of online contents can be shown in display, a shape of the online contents, a color of online contents, an elapsed time of online contents, etc.) for setting the active desktop function.

The method for registering the mobile communication terminal using the automatic update function will now be described with reference to FIG. 4.

Figure 4:
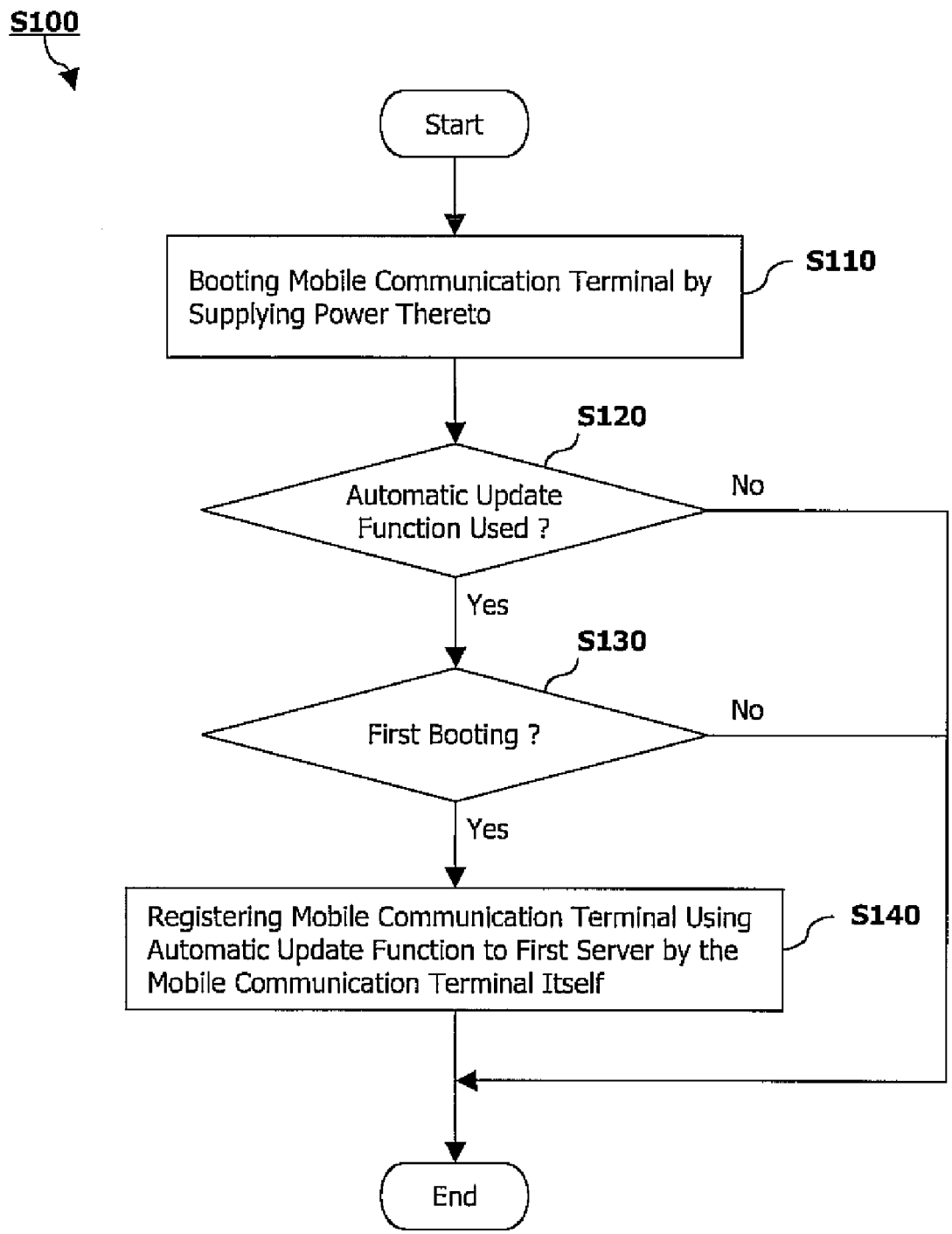
FIG. 4 is an exemplary flow chart illustrating the processes of a method for registering the mobile communication terminal in FIG. 3.

FIG. 4 is a flow chart illustrating the processes of an exemplary method for registering the mobile communication terminal in FIG. 3.

As shown in FIG. 4, the method for registering the mobile communication terminal providing online contents in accordance with the present invention may include: booting the mobile communication terminal upon receiving power (step S110); checking whether the automatic update function is used when the mobile communication terminal is booted (step S120); checking whether the booting is an initial booting when the automatic update function is used (step S130); and registering the mobile communication terminal to the first server by the mobile communication terminal itself if the booting is the initial booting (step S140).

The method for registering the mobile communication terminal providing online contents in accordance with the present invention will be described in detail as follows.

First, the mobile communication terminal 1100 is booted upon receiving power (step S110). When the mobile communication terminal is booted, the controller 130 checks whether the automatic update function is used (step S120). Namely, the controller 130 can set or release the automatic update function according to a user selection with respect to an option for setting the automatic update function.

When the automatic update function is used, the controller 130 checks whether the booting is a first (initial) booting (step S130). If the booting is the first booting, the mobile communication terminal registers itself to the first server 200 (step S140). Namely, by checking whether the booting is the first booting for using the automatic update function, the controller 130 can know whether the mobile communication terminal has been registered to the first server 200.

When the booting is the first (initial) booting, the controller 130 registers the mobile communication terminal to the first server 200 and sequentially displays the plurality of online contents set as default in the pre-set region of the display unit 160. If, however, the booting is not the first booting, the controller 130 sequentially displays the plurality of online contents set as default on the pre-set region of the display unit 160 without the process of registering the mobile communication terminal to the first server 200 (step S200).

Thereafter, the controller 130 checks whether the pre-set time has lapsed (step S300). Namely, after registration, the controller 130 can download the plurality of online contents from the second server in a periodic manner (i.e., download at each pre-set time) (step S400). A method for discriminating the plurality of online contents according to text and images, and downloading the text of the plurality of the online contents will now be described with reference to FIG. 5.

Figure 5:
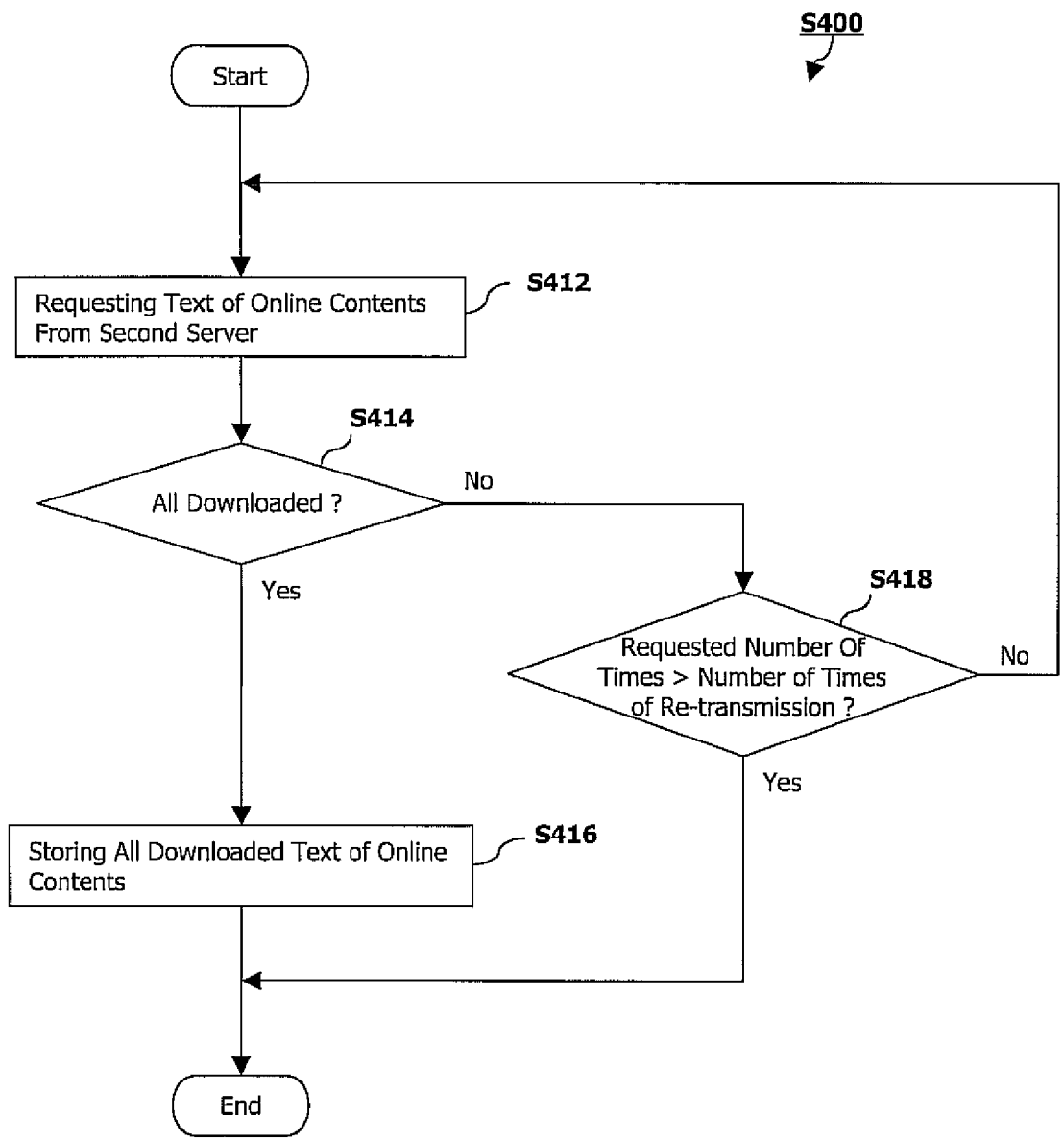
FIG. 5 is an exemplary flow chart illustrating the processes of a method for downloading text of online contents in FIG. 3.

FIG. 5 is a flow chart illustrating the processes of a method for downloading text of online contents in FIG. 3.

As shown in FIG. 5, the method for downloading text of online contents in accordance with the present invention may include: requesting text of the online contents from the second server when the pre-set time elapses (step S412); checking whether requested text of the online contents has been all downloaded (step S414); and storing all the downloaded text of the online contents when the text of the online contents is completely downloaded (step 416). Herein, the text of the online contents may refer to XML (eXtensible Markup Language) documents.

If the text of the online contents has not been completely downloaded, re-transmission of the text of the online contents may be requested by up to a pre-set number of times (step S418).

The method for downloading text of the online contents in accordance with the present invention will be described in more detail as follows.

First, when the pre-set time lapses, the controller 130 requests text of the plurality of online contents from the second server (step S412). Namely, the controller 130 can download the plurality of online contents at every pre-set time through the automatic update function, and the second server 300 also can is download the plurality of online contents from Web sites providing the online contents through the automatic update function. Here, the pre-set time may be changed or modified automatically or manually. Namely, if the user has a special interest on a certain online content, which may be automatically detected based on pre-stored a user preference setting (i.e., user's age, hobby, gender, etc.)_or may be manually achieved through a input unit (e.g., keypad, function buttons, touch-sensitive input device, etc. to allow audible, visual, and/or tactile inputs) mounted in the mobile communication terminal. Here, the pre-set time of the certain types of contents may have a relatively longer time value than other types of contents.

After downloading the text of the plurality of online contents from the second server 300, the controller 130 checks whether the text of the plurality of online contents has been all downloaded (step S414). Namely, if the text of the plurality of online contents has not been completely downloaded, the controller 130 can request re-transmission of text of the online contents which has not been downloaded, by as many as pre-set number of times (step S418).

When the text of the plurality of online contents has been completely downloaded, the controller 130 stores the downloaded text of the online contents in the memory 120 (step S416).

Thereafter, the controller 130 downloads images corresponding to the stored text of the online contents, and the method for downloading the images of the online contents will now be described with reference to FIG. 6.

Figure 6:
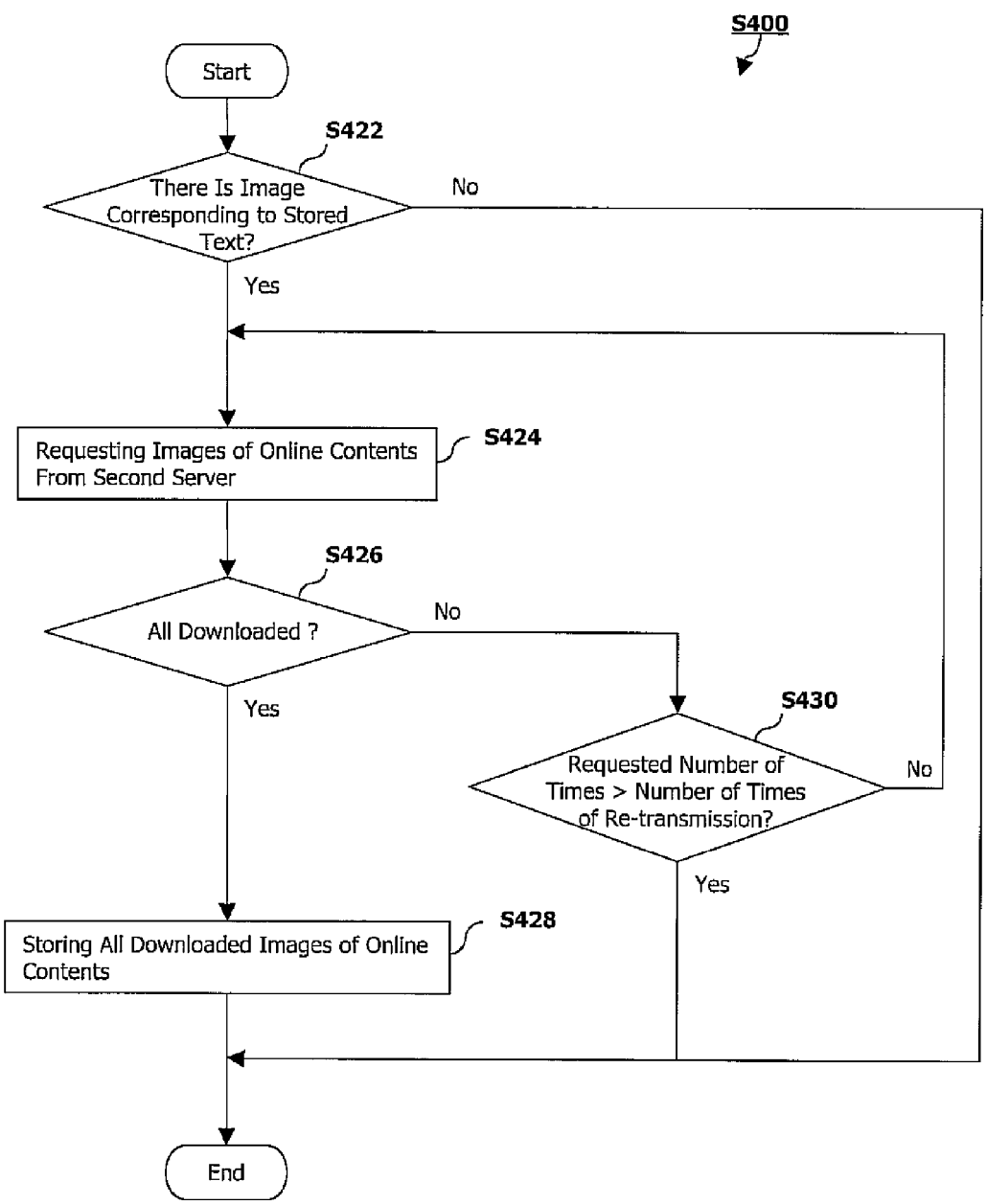
FIG. 6 is an exemplary flow chart illustrating the processes of a method for downloading images of online contents in FIG. 3.

FIG. 6 is a flow chart illustrating the processes of a method for downloading images of online contents in FIG. 3.

As shown in FIG. 6, the method for downloading images of the online contents in accordance with the present invention includes: analyzing the stored text of the online contents and checking whether there is an image corresponding to the text (step S422); requesting images of the online contents from the second server when there are images corresponding to the text (step S424); checking whether the requested images of the online contents have been all downloaded (step S426); and storing all the downloaded images of the online contents when the images of the online contents have been all downloaded (step S428).

In this case, if the images of the online contents have not been completely downloaded, the mobile communication terminal requests re-transmission of the text of the online contents by up to pre-set number of times (step S430).

The method for downloading the images of the online contents in accordance with the present invention will be described in detail as follows.

First, the controller 130 analyzes the downloaded text of the online contents to check whether there are images corresponding to the text (step S422), and requests images corresponding to the text from the second server 300 (step S424).

The controller 130 downloads the images of the plurality of online contents from the second server 300 and checks whether the images of the plurality of online contents have been all downloaded (step S426). If the images of the plurality of online contents have not been all downloaded, the controller 130 can request re-transmission of the images of the online contents which have not been downloaded by as many as pre-set number of times (step S430).

When the images of the plurality of contents have been all downloaded, the controller 130 stores the downloaded images of the online contents in the memory 120 (step S428).

As a result, the mobile communication terminal 100 can sequentially display the downloaded online contents, namely, the text and the images, on the pre-set region of the display unit 160 (step S500).

The display unit of the mobile communication terminal, on which the online contents are displayed, will now be described with reference to FIG. 7.

Figure 7:
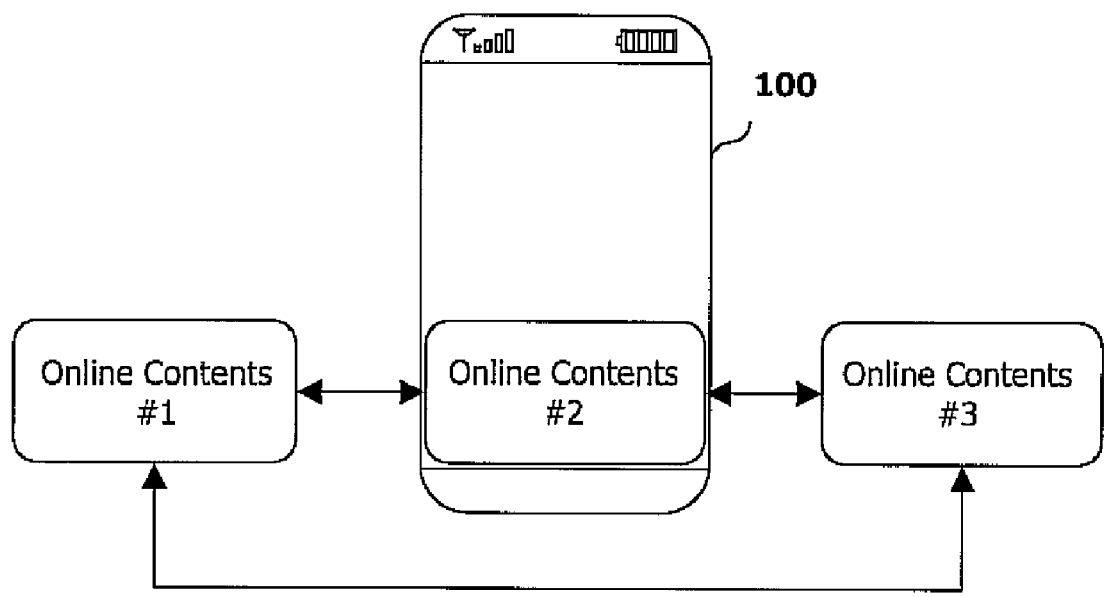
FIG. 7 is an exemplary view showing a display unit of the mobile communication terminal in accordance with the present invention.

FIG. 7 is a view showing the display unit of the mobile communication terminal in accordance with the present invention.

With reference to FIG. 7, the mobile communication terminal sequentially displays the online contents on a pre-set region of the display unit. The displayed the online contents can be shifted at pre-set time intervals or according to a user selection.

The mobile communication terminal can not only sequentially display the online contents on a pre-set region, namely, at least one of up, down, left and right regions of the display unit but also selectively shift the online contents in one of up, down, left and right directions.

In order to provide online contents selected by the user from the displayed the online contents, the mobile communication terminal can be connected with a corresponding Web site and execute corresponding online contents.

For example, when online contents for receiving new music video is selected by the user, the mobile communication terminal 100 can be connected with a Web site corresponding to the selected online contents, so that the user can enjoy the new music video in real time through the connected Web site.

As so far described, the content providing system and method in accordance with the present invention can enhance user convenience in using online contents by sequentially displaying a plurality of online contents on a predetermined region of a display unit and periodically downloading the online contents by using an automatic update function, and its method.

In the above exemplary description, it has been described that the first sever serves as the register server, and the second server serves as the provision server, but the first server and the second server can be incorporated into one server, which can perform both function of the register server and the provision server.

And, in the above exemplary description regarding the present invention features, it can be understood that communication devices (terminals, handsets, PDAs, notebook computers, etc.) are being implemented with various image processing functions in order to enhance user's responsiveness for the online contents. To do so, many technical aspects need to be considered.

Due to the particular characteristics of a mobile communication terminal, various aspects, such as mobility, limited processor capabilities, restricted memory size, restrictions on battery power consumption, a relatively small-sized display screen, etc., need to be considered when implementing the present invention. For example, a small portion of the screen (or pop-up window) may be used for visually displaying the plurality of online contents, while most of the screen is used to display the broadcast streaming service. However, due to the relatively small size of the display screen or limited processor capabilities, or limited battery power, it may only be possible to display limited number of online contents. Also, the memory or other type of storage means may have a limited capacity, so thus it can be understood that the number of online contents being stored may need to be restricted. For instance, the memory or storage for the mobile communication terminal may be capable of storing about 15 minutes' worth of the online contents. Thus, if the user keeps using of the mobile communication terminal for more than 15 minutes (or whatever the buffer or memory capacity is), then the "older" online content may need to be deleted so that "newer" online contents can be stored. Such deletion may be performed automatically without any user intervention, or the user may be asked whether the deletion of "older" data would be acceptable. Also, instead of storing a complete full version of the online contents during the usage of the mobile communication terminal, such contents may be stored in a compressed or abbreviated manner. For example, online contents such as some of commercials or advertisements in the streaming broadcast service data may be detected and not recorded (stored) in memory in order to save memory capacity. Here, it can be understood that commercials and advertisements may initially be stored, but upon detection that the memory capacity is almost full, any recorded commercials or advertisements may then be deleted. Alternatively, the image resolution or data file size of online contents may be reduced (compressed) for storage so that more content can be stored into the memory. Although the image resolution of the online contents may be degraded somewhat, the user may nonetheless be satisfied that he may still observe some of online contents that he or she has a most interest.

The present invention is described as being implemented in a general mobile communications system. However, the features of the present invention may also be adapted and implemented in communications systems operating under other types of communication specifications (e.g., 3GPP2, 4G, IEEE, OMA, etc.), because the concepts and teachings of the present invention could be applied to various communication schemes that operate in a similar manner based upon common techniques. Furthermore, the present invention not only results in supporting online contents in general calling process, but also, can be applied in any other current technology. Namely, digital broadcasting technologies (e.g., satellite or terrestrial digital multimedia broadcasting (DMB), digital video broadcasting for handheld (DVB-H), etc.), downloading streaming videos from Internet servers, performing multimedia communications via wireless interfaces (Wi-Fi, Wi-MAX, etc.) and the like, are some non-limiting examples of practical applications that would benefit from the teachings and suggestions of the present invention.

To implement the various features described above, the present invention can employ various types of hardware and/or software components (modules). For example, different hardware modules may contain various circuits and components necessary to perform the steps of the above method. Also, different software modules (executed by processors and/or other hardware) may contain various codes and protocols necessary to perform the steps of the present invention method.

Furthermore, the mobile communication terminal 100 may be configured to comprise a storage media receiving port that allows an external storage medium (such as a memory card) to be inserted thereto for storing data therein. Also, an additional (optional) function unit (such as a broadcast reception module, MP3 module, Internet banking module, etc.) may be provided.

Additionally, even though it would be too numerous to list all the features and variations that can be implemented in mobile communication terminals to accommodate and support the recent trend towards convergence of electronic and/or digital devices, those skilled in the art would easily understand that elements (i.e., hardware, software, or a combination thereof) that are equivalent to the function units and/or modules described above may be implemented in the mobile communication terminal in accordance with the present invention.

The present invention may provides a mobile communication apparatus, comprising: a screen to display information; a transceiver to receive a multimedia announcement via a communications network; a memory to store the multimedia announcement received by the transceiver; and a processor, cooperating with the screen, the transceiver, and the memory to perform the steps of, initially receiving text data of the multimedia announcement, subsequently receiving image data of the multimedia announcement that corresponds to the initially received text data after successfully receiving all text data, and displaying the received text and image data of the multimedia announcement at an appropriate location of the screen. Here, the multimedia announcement may contain a commercial advertisement or an information notice, and the initially receiving text data step may comprises: checking whether all text data was successfully received upon transmission from the network, informing the network of any text data that was unsuccessfully received, optionally receiving any previously unsuccessfully received text data upon re-transmission from the network, and informing the network that all text data was successfully received after transmission and optional re-transmission from the network.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile communication terminal, comprising:
   a transceiver for receiving at least one multimedia announcement periodically from a server via a communications network;
   a display unit for displaying the at least one multimedia announcement received by the transceiver;
   a memory for storing the at least one multimedia announcement received by the transceiver; and
   a controller configured to cooperate with the transceiver, the display unit, and the memory to:
     receive text data of the at least one multimedia announcement;
     receive image data of the at least one multimedia announcement that corresponds to the received text data after successfully receiving all the text data, wherein the text and image data of the multimedia announcements are periodically received; and
     display the received text and image data of the at least one multimedia announcement on a pre-set region of the display unit.

2. The terminal of claim 1, wherein the controller periodically updates the displayed at least one multimedia announcement from the server by using an automatic update function.

3. The terminal of claim 2, wherein the controller registers the mobile communication terminal using the automatic update function to a register server.

4. The terminal of claim 3, wherein when the mobile communication terminal is first booted, the controller registers the mobile communication terminal to the register server.

5. The terminal of claim 1, wherein the display unit sequentially displays the at least one multimedia announcement of a plurality of online contents at pre-set time intervals.

6. A method for providing multimedia announcements of a mobile communication terminal, comprising:
   receiving text data of the multimedia announcements of a plurality of online contents via a transceiver;
   receiving image data of the multimedia announcements via the transceiver after successfully receiving all text data, the image data corresponding to the received text data of the multimedia announcements, wherein the text and image data of the multimedia announcements are periodically received; and
   sequentially displaying the received text and image data of the multimedia announcements on a pre-set region of a display unit.

7. The method of claim 6, further comprising:
   the mobile communication terminal registering itself to a server using an automatic update function.

8. The method of claim 7, wherein the registering step comprises:
   checking whether the automatic update function is used when the mobile communication terminal is booted;
   checking whether the booting is a first booting when the automatic update function is used; and
   registering the mobile communication terminal to the server when the booting is the first booting.

9. The method of claim 8, further comprising:
   downloading the multimedia announcements of a plurality of online contents from the server at pre-set time intervals, if the booting is not the first booting.

10. The method of claim 9, wherein the downloading step comprises:
    requesting text of the plurality of online contents from the server via the controller when a pre-set time lapses;
    downloading the text of the plurality of online contents from the server via the controller and storing the downloaded text in a memory;
    analyzing the stored text of the plurality of online contents via the controller and requesting images of the plurality of online contents via the controller from the server according to the analysis result; and
    downloading the images of the plurality of online contents from the server and storing the downloaded images in the memory.

11. The method of claim 10, wherein the step of storing the downloaded text comprises:
    checking whether the text of the plurality of online contents has been completely downloaded from the server via the controller; and
    storing all the downloaded text of the plurality of online contents in the memory when the text of the online contents has been completely downloaded.

12. The method of claim 11, wherein when the text of the plurality of online contents has not been completely downloaded, the text of the plurality of online contents is requested again via the controller up to a pre-set number of times.

13. The method of claim 10, wherein the step of requesting the images comprises:
    analyzing the stored text of the plurality of online contents via the controller and checking whether there are images corresponding to the text via the controller; and
    requesting the images of the plurality of online contents via the controller when there are images corresponding to the text.

14. The method of claim 10, wherein the step of storing the downloaded images comprises:
    checking whether the images of the plurality of online contents has been completely downloaded from the server via the controller; and storing all the downloaded images of the plurality of online contents in the memory when the images of the online contents have been completely downloaded.

15. The method of claim 14, wherein when the images of the plurality of online contents have not been completely downloaded, the images of the plurality of online contents are requested again via the controller up to a pre-set number of times.

16. A method for providing a content of a mobile communication terminal, comprising:
receiving text data of at least one online content from a server via a controller when a pre-set condition is satisfied;
selectively requesting image data corresponding to the text data from the server via the controller;
receiving the image data of the at least one online content from the server via the controller after successfully receiving all text data;
displaying one of the received text data and image data of the at least one online content on a pre-set region of a display unit.

17. The method of claim 16, wherein the pre-set condition includes any one of a specific time or a specific position.

18. The method of claim 16, wherein requesting the text data comprises requesting the text data from the server.

19. The terminal of claim 4, wherein the controller sets or releases the registration of the mobile communication terminal according to a user selection.

20. The method of claim 9, wherein the pre-set time intervals are automatically changed based on a pre-stored user preference setting.

21. The terminal of claim 19, wherein the display unit sequentially displays the at least one multimedia announcements in a horizontal direction or a vertical direction.

22. The terminal of claim 1, wherein the pre-set region is one of upper, lower, or side area of the display unit.

23. The terminal of claim 1, wherein the controller is further configured to:
check whether all the text data was successfully received upon transmission from the network and informing the network of any text data that was unsuccessfully received,
receive any previously unsuccessfully received text data upon re-transmission from the network, and
inform the network that all text data was successfully received after transmission and optional re-transmission from the network.

24. The terminal of claim 1, wherein the controller is further configured to cooperate with the display unit, the transceiver, and the memory based upon at least a display size, memory size, processor power, or battery power.

25. The terminal of claim 1, wherein the at least one multimedia announcement is received from the communications network via a wired or wireless interface.

26. The terminal of claim 1, wherein a server downloads the text and images of the at least one multimedia announcement from a corresponding Web site by using an automatic update function.

27. The terminal of claim 1, wherein at least one of a total number of the at least one multimedia announcement displayed in the display unit, a shape of the at least one multimedia announcement, a color of the at least one multimedia announcement, an elapsed time of the at least one multimedia announcement is set or released by a user selection.

* * * * *